Figure 1:
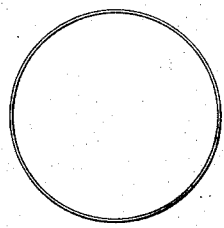

July 21, 1959  D. POWELL ET AL  2,895,527
RESHAPING OF CAN BODIES
Filed May 31, 1955  2 Sheets-Sheet 1

Inventors
Dan Powell &
Wilfred James Allsop
By
Mason, Porter, Diller & Stewart
Attorneys July 21, 1959　　　D. POWELL ET AL　　　2,895,527
RESHAPING OF CAN BODIES
Filed May 31, 1955　　　　　　　　　　　　2 Sheets-Sheet 2
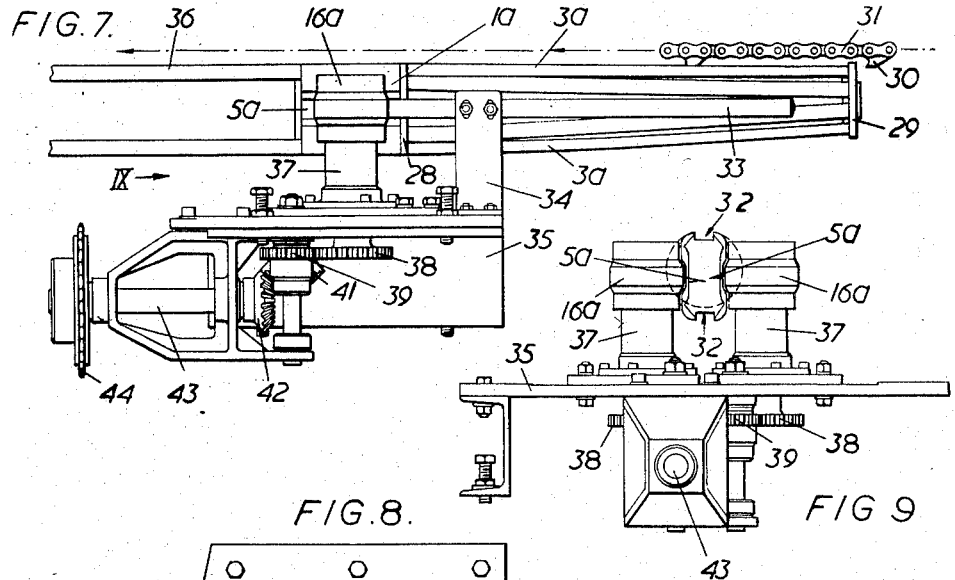
FIG.7.　　FIG.8.　　FIG 9
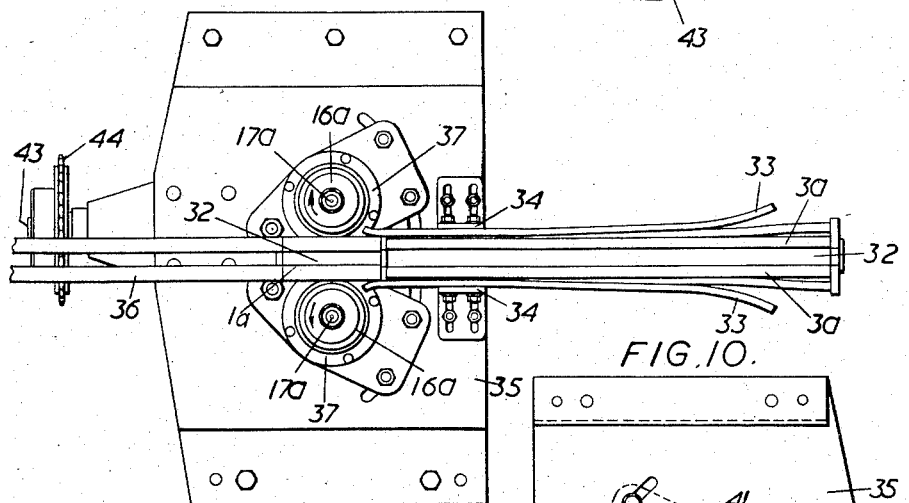
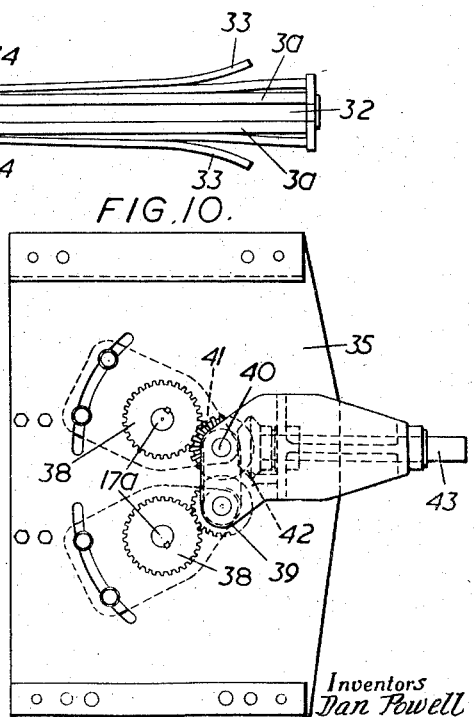
FIG.10.
Inventors
Dan Powell
& Wilfred James Allsopp.
By
Attorney

United States Patent Office 2,895,527
Patented July 21, 1959

2,895,527

RESHAPING OF CAN BODIES

Dan Powell and Wilfred James Allsopp, Worcester, England, assignors to The Metal Box Company Limited, London, England, a British company Application May 31, 1955, Serial No. 512,173

2 Claims. (Cl. 153—2)

This invention relates to the manufacture of can bodies.

In one method of manufacturing can bodies a blank sheet of metal is formed into cylindrical or other form and the meeting edges are joined by a lock and/or lap seam. The jointed edges may then be soldered thereby forming what is known as a can body. These operations are normally performed on a body-making machine and although it is possible to form can bodies of irregular shape, for example of substantially rectangular cross-section, on such a machine, it is sometimes found to be desirable to reform can bodies of circular cross-section to bodies of irregular shape, for example of substantially rectangular cross-section.

It is an object of the present invention to provide apparatus for reforming can bodies of circular cross-section to an irregular shape, for example to substantially rectangular cross-section, and to so shape the reformed bodies as to enhance the appearance thereof and/or to provide strengthening or shape retaining panels therein.

According to the present invention apparatus for reforming can bodies of circular cross-section to an irregular cross-section comprises a mandrel on which a can body of circular cross-section is positioned and reformed substantially to the desired irregular cross-section, and bending means to engage the interior and exterior of opposite sides of a reformed can body to form in each said side a permanent bend extending lengthwise of the body.

Further according to the present invention apparatus for reforming can bodies of circular cross-section to substantially rectangular cross-section comprises a mandrel to receive and reform a can body of circular cross-section to a substantially rectangular cross-section, and bending means to engage the interior and exterior of the wider sides of a reformed can body to form in each said wider side a permanent bend extending lengthwise of the body.

Still further according to the present invention apparatus for reforming can bodies of circular cross-section to an irregular cross-section comprises a mandrel to receive and reform a can body of circular cross-section substantially to the desired irregular cross-section, an anvil supported in fixed relation to the mandrel for engagement with the interior of opposite sides of a can body reformed by the mandrel, shaping means to engage the exterior of said opposite can body sides and to co-operate with the anvil to form in said body sides permanent bends extending lengthwise of the body, and means to cause relative movement between a reformed can body and said shaping means to effect the bending of said opposite sides of the can body.

Further according to the invention apparatus for reforming can bodies of circular cross-section to substantially rectangular cross-section comprises a mandrel to receive and reform a can body of circular cross-section to a substantially rectangular cross-section, an anvil supported in fixed relation to the mandrel for disposition in a body reformed by the mandrel, shaping means to co-operate with the anvil to form in each wider opposite side of a reformed can body a permanent bend extending lengthwise of the body, and means to cause relative movement between a reformed can body and said shaping means to effect said bending of the wider sides of the can body.

The anvil may be supported for co-operation with the interior of a reformed can body and have two opposite sides shaped according to the shape of the bends to be formed in said opposite sides of a can body.

The shaping means may comprise rollers shaped peripherally to co-operate with said shaped sides of the anvil.

The rollers may be freely rotatable on supporting means movable relative to and lengthwise of the anvil.

The mandrel may comprise reforming elements supported for movement towards and away from the sides of the anvil contiguous with said shaped sides thereof and may include operating means connected with the reforming elements to cause movement thereof away from the anvil to effect reforming of a can body and movement thereof towards the mandrel to permit a reformed body to be removed from the mandrel and a further body to be positioned relative thereto for reforming.

The apparatus may include for said roller supporting means actuating means operable in timed relation with said operating means whereby to cause movement of the rollers relative to the anvil after reforming of a can body and before the return of the reforming elements to the inactive position thereof.

The operating means may include a rod movable axially through the anvil, pivoted links connected to said rod and reforming elements to cause simultaneous movements of the reforming elements to and from the inactive positions thereof in response to axial movements of said rod, and manually controlled means connected to said rod to effect axial movements thereof.

Operation of the actuating means may be controlled by switch means operable by said manually controlled means when the latter is in the fully active position thereof.

In one embodiment of the invention the mandrel may comprise fixed reforming elements extending from one end of said anvil and there may be provided conveyor means to engage a can body and to move the body over the mandrel to effect reforming thereof and between the anvil and rollers to form said permanent bends in the wider sides of the reformed body.

The shaping rollers may be supported for rotation about fixed axes and the apparatus include driving means operative positively to rotate the rollers about said axes.

The shaping means may be arranged to form in the wider sides of a reformed can body opposed panels in planes substantially parallel with the planes of the unbent portions of the wider sides.

Figure 2:
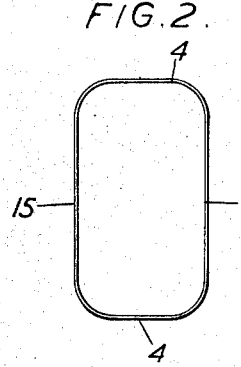
Figure 3:
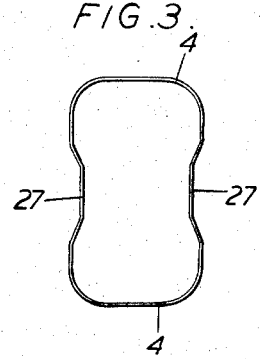
Figure 4:
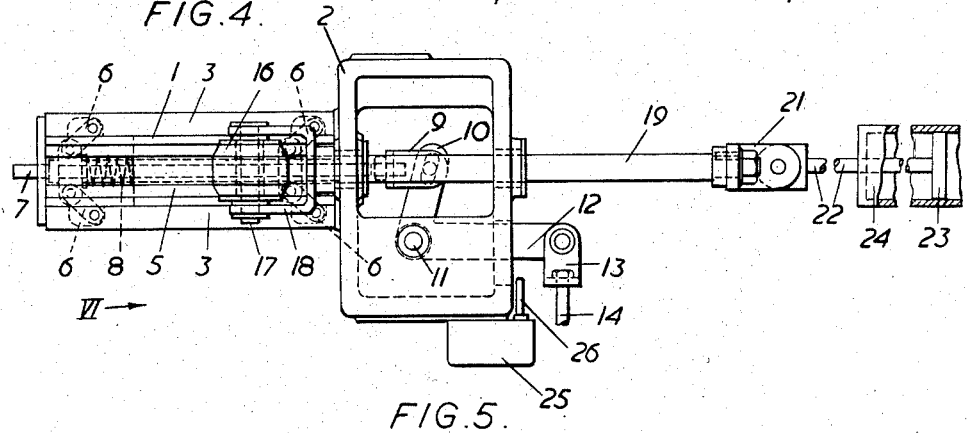
Figure 5:
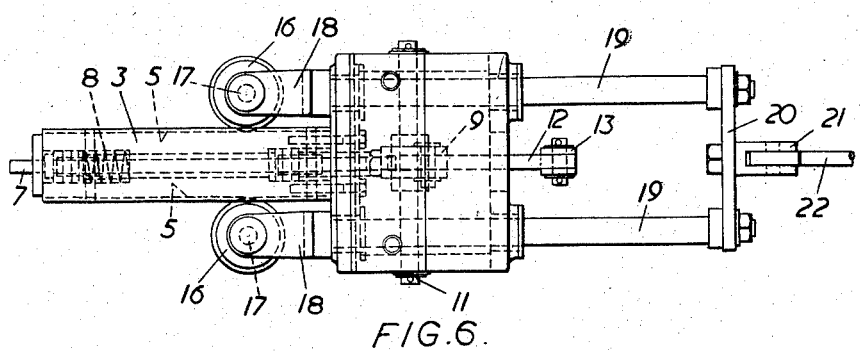
Figure 6:
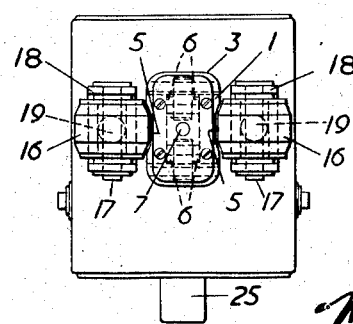

In order that the invention may be clearly understood two embodiments thereof will now be described, by way of example, with reference to the accompanying diagrammatic drawings in which:

Fig. 1 is a diagrammatic end view of a can body of circular cross-section,

Fig. 2 is a diagrammatic end view of a can body of substantially rectangular cross-section formed from the can body shown in Fig. 1, Fig. 3 is a diagrammatic end view of a can body of substantially rectangular cross-section formed from the can body shown in Fig. 2 and provided with panels in the wider sides of the can body, Fig. 4 is a side elevation of reforming apparatus to and from which can bodies of circular cross-section are fed manually, Fig. 5 is a top plan of Fig. 4, Fig. 6 is an end view of Fig. 4 looking in the direction of arrow VI, Fig. 7 is a side elevation of reforming apparatus for fitment to a can body-making machine and in which cans issuing from the body-making machine are fed automatically to and from the reforming apparatus, Fig. 8 is a top plan of Fig. 7, Fig. 9 is an end view of Fig. 7 looking in the direction of arrow IX, and Fig. 10 is an underneath plan of a part of Fig. 7.

Referring to Figs. 4 to 6 of the drawings, a can body of circular cross-section as illustrated in Fig. 1 is fitted manually over the end of a mandrel which has an anvil 1 supported to be in fixed relation thereto by a frame member 2. The mandrel comprises two reforming elements 3 which are to reform a can body of circular cross-section to one of substantially rectangular cross-section and to fully engage the narrower sides 4, Figs. 2 and 3, of the reformed body.

The reforming elements 3 are supported for movement towards and away from the upper sides of the anvil 1, these sides being contiguous with two opposite shaped sides 5, Fig. 6. As shown in the drawings the mandrel is in the closed, or normally inactive, position thereof in which position the reforming elements 3 are in substantially abutting relation with the anvil so that a can body of circular cross-section can be easily placed over the mandrel and a reformed body can be easily removed therefrom. The reforming elements 3 are connected by links 6 which are pivotally connected to the elements 3 and to a rod 7. The rod 7 is supported in the frame member 2 for movement lengthwise through the anvil 1 and a spring 8 urges the rod to the normally inactive position thereof as shown in the drawings. One end of the rod is connected to a fork 9 which, in turn, is connected to one arm 10 of a bell-crank lever pivoted at 11 to the frame member 2. The other arm 12 of the bell-crank lever has connected thereto a fork 13 which, in turn, is connected to a rod 14 movable lengthwise by a foot pedal, not shown. When the rod 14 is moved downwards from the position shown in Fig. 4, the bell-crank lever is rocked clockwise about its pivot 11, thus moving rod 7 to the right, as viewed in Fig. 4, against the action of the spring 8 so that the links 6 cause the reforming elements 3 to be moved away from the anvil 1 and if a can body of circular cross-section is in position on the mandrel at this time, the outward movement of the reforming elements 3 will reform the can body so that it has a substantially rectangular cross-section as shown in Fig. 2. It will be understood that the longitudinal seam, not shown in Figs. 1 to 3, of a can body will be so positioned relative to the mandrel prior to the reforming operation that when the can body is reformed to the substantially rectangular cross-section thereof, the seam will extend lengthwise of one of the shorter sides 4 thereof and will be disposed substantially centrally of such shorter side.

As mentioned above, the sides of the anvil which are engaged by the wider sides 15, Fig. 2, of a reformed body are shaped as indicated at 5, Fig. 6, and with these shaped sides of the anvil, to form therewith shaping means for the wider sides of a reformed body, co-operate a pair of rollers 16 freely rotatable about pins 17. The rollers 16 are supported to be movable relative to and lengthwise of the anvil and the wider sides of a reformed can body, and are supported for said relative movement by fork members 18, mounted at the ends of rods 19 supported for lengthwise reciprocation in the frame member 2. The rods 19 are coupled together by a plate 20 so that the rods, the plate, and the fork members 18 together form a carriage for the rollers 16. Connected to the plate 20 is a fork 21 to which in turn is connected a piston rod 22 operable by a piston 23 housed in an air cylinder 24. Control of the piston 23 is effected in any suitable manner by means of a micro-switch 25, Fig. 4, having an actuating member 26 for operation by the arm 12 of the bell-crank lever.

The rollers 16 are profiled, as shown in the drawings, to co-operate with the shaped sides 5 of the anvil so that on lengthwise movement of the rods 19, to the left as viewed in Fig. 4 the rollers will be moved relative to and over the wider sides 15 of a can body which has been reformed by the mandrel reforming elements 3, thereby to co-operate with the anvil to form a permanent bend, as shown in Fig. 3, in each of the wider sides of the reformed can body, said bends extending lengthwise of the body and being, as shown in Fig. 3, directed towards the center of the body. From the drawings it will be observed that the shaped sides of the anvil and the rollers 16 co-operate to form in the wider sides of a reformed can body opposed panels 27, Fig. 3, which panels lie in planes substantially parallel with the plane of the unbent portions of the wider sides 15 of the body.

The actuating means 19, 20, 21, 22, 23 and 24 for the rollers are operable in timed relation with the operating means 10, 12, 13 and 14 for effecting operation of the reforming elements 3 so as to effect formation of the bent portions 27 after operation of the reforming elements 3 to reform a can body. Control of the movement of the rollers relative to a reformed can body, is as stated above, effected by the micro-switch 25, which is operated by the arm 12 of the bell-crank lever. The arm 12 during its downward movement co-operates with the actuating member 26 so that when the arm 12 is moved downwards to the fully active position thereof the micro-switch 25 operates to control admission of air to the cylinder 24 so that the rods 19 and rollers 16 are then moved, to the left as viewed in Fig. 4, to effect deformation of the wider sides of the reformed can body. After return of the rollers 16 to the inactive positions thereof, as shown in Fig. 4, the bell-crank 10, 12 is restored to its normally inactive position by the spring 8 so that the reforming elements 3 are also restored to their inactive positions and the reformed and shaped can body can be easily withdrawn manually from the mandrel.

Figs. 7 to 10 illustrate apparatus to be fitted to a can body-making machine. In this embodiment of the invention a fixed anvil 1a has extending lengthwise from one end thereof fixed reforming elements 3a supported in spaced relation by plates 28, 29 secured to the ends thereof, the anvil 1a being also secured to the plate 28. The reforming elements 3a, at the ends thereof which abut the anvil 1a, define a general cross-section corresponding to the substantially rectangular cross-section to which a can body is to be reformed and they taper towards the plate 29, and, at that end thereof, they define a generally circular cross-section to permit a can body of circular cross-section to be fed endwise on to the mandrel directly from the body-making machine. It will be understood that as the can bodies are delivered from the body-making machine the seams of the bodies are always on the upper side thereof, thus, when a body is delivered from the body-making machine and moves lengthwise along the mandrel the body is reformed so that the seam is located lengthwise of one of the shorter sides 4 of the reformed body and is substantially central therewith.

The rear end of the can body as it issues from the body-making machine is engaged by a pusher piece 30 on an endless conveyor 31 driven by any suitable means, not shown. The reforming elements 3a and the anvil 1a are provided with slots 32, Figs. 8 and 9, extending lengthwise thereof to permit the passage of the pusher pieces 30. As a pusher piece 30 moves a can body lengthwise along the mandrel, it is passed over the mandrel and between guides 33 carried on brackets 34 secured to a machine frame 35 so that it is gradually reformed from its circular cross-section to a generally rectangular cross-section and it is moved by the pusher pieces 30 from the reforming elements 3a over the anvil 1a and during its passage over the anvil 1a, which anvil has shaped sides 5a, the reformed body is passed between the anvil and a pair of rotating rollers 16a which deforms the wider sides of the can body so that the cross-section thereof assumes the shape shown in Fig. 3. As the reformed and shaped can body leaves the anvil 1a it is moved by the pusher pieces 30 over a mandrel extension 36 from which it can be delivered by the pusher piece to any suitable receptacle.

The rollers 16a are secured to pins 17a, Fig. 8, supported in bearings 37 for positive rotation. Rotation of the spindles 17a is effected by gear wheels 38, Fig. 10, each of which meshes with a gear wheel 39, the gear wheels 39 being in meshing relation one with the other and one of the gear wheels being secured to a spindle 40 to which is also secured a bevel gear 41 meshing with a further bevel gear 42 secured to a driving shaft 43 which is rotated by a sprocket 44, by any suitable means, not shown, such as an electric motor connected to the sprocket by a chain.

In the foregoing description there have been described two embodiments of the invention, each of which embodiment incorporates shaping means comprising a fixed anvil and rollers to co-operate with the opposite shaped sides thereof. It will be understood, however, that, if desired, means other than rollers may be provided for co-operation with the shaped sides of the anvil. Further, it will be understood that although in the foregoing description the reformed can bodies have been described as being provided with panels in the opposite wider sides thereof, the permanent bends formed in said opposite wider sides may be of any other suitable form, for example they may be bowed inwards towards each other.

It will also be understood that, if desired, can bodies of circular cross-section may, by apparatus constructed in accordance with the present invention and including a mandrel and reforming elements of suitable shape, be reformed to an irregular cross-section other than substantially rectangular as described above, for example they may be reformed to be of substantially oval or other desired cross-section. In such instances, however, the reforming mandrel will usually comprise an expanding mandrel of a kind similar to that described with reference to Figs. 4 to 6, although apparatus of the kind described with reference to Figs. 7 to 10 may be employed.

We claim:

1. Apparatus for reforming can bodies of circular cross-section to a rectangular cross-section having inwardly directed panels in opposite wider sides, comprising an expansible mandrel normally contracted for receiving a circumposed circular cross-sectioned can body thereon and including parallel reforming elements for conforming to the narrower opposite sides of a reformed can body, means operatively connected to said reforming elements for simultaneously moving the same away from each other a predetermined distance, said means comprising a longitudinally slidable rod, links pivotally connected to said rod and to said reforming elements of the mandrel, a spring urging said rod to an inactive position, and manually operating lever means for moving said rod against the action of the spring so that the links will cause the reforming elements to move away from each other a predetermined distance, a fixed anvil extending axially of said mandrel and including opposite-shaped and inwardly-directed side portions extending axially thereof and cooperating with contiguous portions of said reforming elements for forming the inwardly directed panels on the opposite wider sides of the can body being reformed, and shaping means including portions conforming to and movable parallel along said opposite-shaped and inwardly directed side portions of said anvil and the contiguous portions of said reforming elements after the mandrel has been expanded for forming said inwardly directed panels on a can body and actuating means connected to said shaping means for moving said shaping means in timed relation with the means for operating the reforming elements of the mandrel.

2. Apparatus according to claim 1, wherein said portions of said shaping means comprise freely rotatable rollers peripherally shaped to conform with said side portions of said anvil and contiguous portions of the mandrel, and wherein said actuating means include an air cylinder and piston, and a switch for controlling the operation of the air cylinder and piston, said switch being actuated by the manually operating lever means after the same has extended the reforming elements the predetermined distance.

References Cited in the file of this patent
UNITED STATES PATENTS

| | | |
|---|---|---|
| 373,743 | Kent | Nov. 22, 1887 |
| 402,140 | Carr | Apr. 30, 1889 |
| 428,416 | Riley | May 20, 1890 |
| 539,297 | Plecker | May 14, 1895 |
| 634,172 | Johnson | Oct. 3, 1899 |
| 1,621,079 | Mohr | Mar. 15, 1927 |
| 1,921,125 | Hughes et al. | Aug. 8, 1933 |
| 2,452,125 | Ingalls et al. | Oct. 26, 1948 |
| 2,461,839 | Neutelings | Feb. 15, 1949 |
| 2,462,080 | Erb | Feb. 22, 1949 |
| 2,748,862 | Alspaugh | June 5, 1956 |